US008862776B2

United States Patent
Merat et al.

(10) Patent No.: US 8,862,776 B2
(45) Date of Patent: Oct. 14, 2014

(54) COMMUNICATION NETWORK AND METHOD OF OPERATION THEREFOR

(75) Inventors: Vincent Merat, La Riviere-de-Corps (FR); Roberta Fracchia, Paris (FR); Chidambar Zinnoury, Evry (FR)

(73) Assignee: Motorola Mobility LLC, Libertyville, IL (US)

( * ) Notice: Subject to any disclaimer, the term of this patent is extended or adjusted under 35 U.S.C. 154(b) by 990 days.

(21) Appl. No.: 12/547,090

(22) Filed: Aug. 25, 2009

(65) Prior Publication Data

US 2010/0057929 A1    Mar. 4, 2010

Related U.S. Application Data

(60) Provisional application No. 61/092,076, filed on Aug. 27, 2008.

(51) Int. Cl.
*G06F 15/16* (2006.01)
*H04L 29/12* (2006.01)

(52) U.S. Cl.
CPC ......... *H04L 61/6077* (2013.01); *H04L 61/2532* (2013.01); *H04L 61/2514* (2013.01); *H04L 29/12367* (2013.01); *H04L 29/12952* (2013.01); *H04L 29/12462* (2013.01); *H04L 29/12415* (2013.01); *H04L 61/255* (2013.01)
USPC ............................ 709/245; 709/229; 709/231

(58) Field of Classification Search
CPC ...................................................... G06F 15/15
USPC ................... 709/227, 229, 231, 245
See application file for complete search history.

(56) References Cited

U.S. PATENT DOCUMENTS

| | | | | |
|---|---|---|---|---|
| 7,685,290 | B2 * | 3/2010 | Satapati | 709/227 |
| 7,761,579 | B2 * | 7/2010 | Khasnabish | 709/227 |
| 2006/0018301 | A1 | 1/2006 | Schrufer | |
| 2006/0062203 | A1 | 3/2006 | Satapati | |
| 2006/0077959 | A1 * | 4/2006 | Beckemeyer | 370/352 |
| 2006/0133343 | A1 * | 6/2006 | Huang | 370/349 |
| 2007/0091872 | A1 * | 4/2007 | Bergenwall | 370/352 |
| 2008/0101357 | A1 * | 5/2008 | Iovanna et al. | 370/389 |
| 2008/0126473 | A1 * | 5/2008 | Ikenaga et al. | 709/202 |

OTHER PUBLICATIONS

Stewart, R. et al.: "Stream Control Transmission Protocol (SCTP) Network Address Translation", draft-stewart-behave-sctpnat-02.txt, May 30, 2006, Network Working Group Internet-Draft Expires: Dec. 1, 2006, all pages.

* cited by examiner

*Primary Examiner* — David Lazaro
*Assistant Examiner* — Marie Georges Henry
(74) *Attorney, Agent, or Firm* — Lerner, David, Littenberg, Krumholz & Mentlik, LLP

(57) ABSTRACT

A communication network comprising a Network Address Translator (NAT) arranged to translate between a public NAT address and a plurality of private NAT addresses. A network element has a plurality of network interfaces each of which corresponds to a private NAT address. A connection processor sets up a connection for data communication which is capable of supporting a plurality of network interfaces of the network element. An identifier processor initializes a network interface identifier for identifying individual network interfaces for the connection. The network interface identifier is distributed to the NAT and the network elements of the connection. Incoming data packets for the network elements are then adapted to include the network interface identifier and the NAT uses this to address the data packets in response to the first network interface identifier.

20 Claims, 8 Drawing Sheets

COMMUNICATION NETWORK AND METHOD OF OPERATION THEREFOR

CROSS-REFERENCE TO RELATED APPLICATION

This application claims priority from provisional application Ser. No. 61/092,076, entitled "A COMMUNICATION NETWORK AND METHOD OF OPERATION THEREFOR," and filed Aug. 27, 2008, which is commonly owned and incorporated herein by reference in its entirety.

FIELD OF THE INVENTION

The invention relates to a communication network, a Network Address Translator (NAT) and a method of operation therefor, and in particular, but not exclusively, to data networks using network address translation and the Stream Control Transport Protocol (SCTP).

BACKGROUND OF THE INVENTION

Data communication networks have become of increasing importance over the last decades as evidenced for example by the popularity of the Internet. In order to ensure compatibility between products and to allow an efficient co-operation between the solutions and components provided by different manufacturers and operators, a number of data communication standards have been defined.

In order to provide flexibility and facilitated design and operation for data communication networks, a number of different data communication protocols have been defined which address and focus on different aspects of the data communication. These protocols typically fall into different layers of the Open Systems Interconnection Basic Reference Model (the OSI Reference Model or OSI Model for short) which is a layered, abstract description for communications and computer network protocol design. The OSI model comprises different layers including (from top to bottom), the Application, Presentation, Session, Transport, Network, Data Link, and Physical layers. A layer is a collection of related functions that provides services to the layer above it and receives service from the layer below it. For example, a layer that provides error-free communications across a network provides the path needed by applications above it, while it calls the next lower layer to send and receive packets that make up the contents of the path.

The best known data communication standard is probably the Internet Protocol (IP) on which the Internet is based. The IP protocol is a layer 3 (network layer) protocol which is used by layer 4 (transport layer) protocols for the communication of data. In many cases, the IP implementation is used in combination with either a Transmission Control Protocol (TCP) or a User Datagram Protocol (UDP) protocol.

In order to continuously improve performance and to provide additional functionality, the defined standards tend to be further developed and new data protocols continue to be defined. Specifically, whereas TCP and UDP are suitable for many applications, they also have some shortcomings. For example, whereas TCP is very suitable for communication of non-real time data, such as file transfers, and UDP is very suitable for transmission of small data messages (datagrams) they tend not to be optimal for supporting applications that require a continuous and possibly real time data stream. Accordingly, a new data protocol known as the Stream Control Transport Protocol (SCTP) has been defined.

SCTP is a reliable, message-oriented transport layer protocol which overcomes many of the drawbacks of TCP and UDP. Indeed, it preserves message boundaries as UDP; it detects lost data, duplicated data and out-of-order data and contains flow and congestion control mechanisms as TCP. Additionally, it features multi-homing (using multiple network interfaces) and multi-streaming (several independent streams in the same connection between two hosts). Thus, a multi-homed host or network element may have a plurality of network interfaces such that it can connect to one or several network(s) through different network interfaces. For example, for an Internet application, a multi-homed host may have two separate Internet connections.

SCTP allows a multi-homed host to establish a connection (also known as an association for SCTP) with another host by providing the other host with the IP addresses (corresponding to its network interfaces) that it wants to use for the connection.

As illustrated in FIG. 1, this is achieved through a four-way handshake between the client and the server upon initialization of the association.

First, the client transmits an INIT message to the server with the INIT message comprising all the network interfaces that the client can be reached on (specifically by including all the corresponding IP addresses).

The server responds by transmitting to the client an INIT-ACK message comprising a cookie (a unique identity of the association) and all the network interfaces on which the server can be reached (again by including all the relevant IP addresses).

The client responds by returning a COOKIE-ECHO message comprising the cookie and the server responds with a COOKIE-ACK message. Following this message, the appropriate resources are allocated and the SCTP association is ready to be used for data transfers between the server and client.

Moreover, SCTP, allows each host to dynamically change the IP addresses used in the association, i.e. to add or remove one (or several) IP address(es). Such a reconfiguration can be achieved by sending an ASCONF message which contains the address(es) the sender wants to add or remove. The remote host responds to receiving an ASCONF message by returning an ASCONF-ACK thereby acknowledging that the ASCONF message has been correctly received and acted on.

However, although SCTP provides a number of advantages, it also has some disadvantages. In particular, a number of problems arise when SCTP is used together with Network Address Translators (NAT). Network address translation is a technique of transceiving network traffic through a router that involves re-writing the source and/or destination addresses. Specifically, a NAT may be used to provide a common (public) IP address for all network elements supported by that NAT. Thus, for any outgoing message of the private network supported by the NAT, the IP address of the originating element is replaced by the IP address of the NAT. Any incoming message will also be addressed to the IP address of the NAT which must then proceed to replace this by the appropriate private IP address of the destination network element. Thus, the NAT must resolve the ambiguity of which network element of the private network is the intended recipient of the received data packet.

For TCP and UDP this ambiguity resolution is typically performed by assigning a unique TCP or UDP port to each connection. Thus, the NAT may store a mapping table which maps the private IP address of each active network element with a unique port number allocated to the connection by the NAT. A destination for an incoming data packet can then be resolved by extracting the corresponding port value for the data packet and using this for a look-up in the mapping table. The corresponding private IP address is then retrieved and used to replace the NAT IP address of the data packet. In order to enable such an approach, the NAT must be able to assign unique port numbers and thus a Port Address Translation (PAT) is also performed by the NAT.

However, such an approach is not suitable for SCTP. Specifically, SCTP uses the source port along with the source IP address to identify the association and therefore it is required that the source port must be the same for all paths between two hosts. Furthermore, as a multi-homed host has a plurality of connections to the network, it will typically be unknown whether such independent network interfaces are supported by the same NAT or by different NATs. Accordingly, if NAT port translation is used, it would be necessary to coordinate the operation of the NATs in order to ensure that the same port would always be allocated to different paths of the same association. Such an approach is typically impractical as it results in increased complexity, increased computational and bandwidth resource requirements etc.

As a specific example, a configuration such as that illustrated in FIG. 2 may be encountered. In this example, two private network elements 201, 203 are supported by the same NAT 205 when communicating with a remote network element 207 via a network 209. In the example, the two network elements 201, 203 may choose the same source port and as the NAT 205 cannot perform port translation, these ports cannot be used to resolve the ambiguity for received data packets (i.e. the port numbers cannot be used to resolve if an incoming data packet addressed to the NAT 205 is intended for the first network element 201 or for the second network element 203).

Another example is shown in FIG. 3 wherein the private network element 201 has two different network interfaces to the NAT 205. As the same port must be used for both network interfaces, this cannot be used by the NAT 205 to resolve the ambiguity for received data packets.

Another example is shown in FIG. 4 wherein the private network element 201 has two different network interfaces but in this example coupled to different NATs 205, 401. In this example, any port translation performed by the NATs 205, 401 would require these to be synchronised to ensure that the same source port was allocated. However, this is impractical as it is generally not known by the individual NAT which other NATs may support a specific network element.

It should also be noted that it is generally not known to the network element 201 which NAT(s) its interface(s) are supported by or indeed whether these are supported by the same or different NATs. Accordingly, any coordination between NATs would require coordination between all possible NATs.

Hence, an improved communication would be advantageous and in particular a system allowing increased flexibility, reduced complexity, reduced computational resource usage, facilitated operation, facilitated and/or improved support for network address translators, facilitated and/or improved support for STCP protocols, and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a communication network comprising: a first Network Address Translator, NAT, arranged to translate between a public NAT address and a plurality of private NAT addresses for a plurality of network elements supported by the first NAT; a first network element of the plurality of network elements having a plurality of network interfaces, each network interface corresponding to a private NAT address; a connection processor for setting up a connection for data communication between the first network element and a second network element, the connection being capable of supporting a plurality of network interfaces for the first network element; an identifier processor for initializing a first network interface identifier for identifying a first network interface for the connection; a distribution processor for providing the first network interface identifier to at least the first network element, the second network element and the first NAT; and wherein the second network element is arranged to include the first network interface identifier in at least some data packets for the first network element; and the first NAT is arranged to address the at least some data packets to the first network interface of the first network element in response to the first network interface identifier.

The invention may allow improved performance in many communication networks. Specifically, the invention may facilitate and/or improve the use of network address translation in systems also supporting multi-homing network elements capable of using a plurality of interfaces for a single connection.

In many embodiments, the invention may allow a flexible and/or facilitated network architecture to be implemented and may e.g. allow NATs to be removed and/or added without requiring any reconfiguration or knowledge by other network elements.

The approach may specifically provide an efficient, reliable and/or flexible ambiguity resolution for network address translation. Furthermore, this may be achieved without requiring any port translation or consideration.

For example, an implementation using SCTP may allow simplified and/or improved support for network address translation for multi-homed network elements without requiring any port translation to be implemented.

The NAT provides a translation between a public address of the NAT and private addresses of network elements of a private network supported by the NAT. The first network element is part of the private network.

A connection may correspond to a establishment of a framework between two network elements for communicating data between the network elements. Each connection may support a plurality of transports where a transport is an individual link between an address of a network interface of one network element of the connection and an address of a network interface of the other network element of the connection. Each network interface may thus correspond to one interface or address of one of the involved network elements.

The connection may specifically be an SCTP association and each network interface may correspond to an individual address for the corresponding network element. Specifically, for an IP implementation, each network interface of the first network element may correspond to one private IP address. In such an embodiment, the NAT may specifically translate/change the IP address across the private network/public network border but will not modify the network interface identifier. Furthermore, it may not modify any ports and specifically may not perform any port translation.

Each network interface may correspond to one transport address for an association involving the first network element and each transport address may correspond to a specific network interface. A Transport Address may be made up by a Network Layer address, a Transport Layer protocol and a Transport Layer port number. In the case of SCTP running over IP, a transport address may be made up by the combination of an IP address and an SCTP port number (where SCTP is the Transport protocol). Thus, the IP address of a network interface will typically be part of the transport address for the network interface.

The network interfaces of the first network element may be supported by the same NAT or by different NATs. Thus, each network interface may correspond to a private NAT address for the same NAT or may be private NAT addresses of different NATs. In some scenarios, the first network element may alternatively or additionally have network interfaces that have public addresses (i.e. which may not be supported by a NAT).

A network element may be considered supported by a NAT if the NAT performs address translation for at least one network interface of the network element.

In addition to the network interfaces having a private address, the first network element may further have one or more network interfaces having a public address.

According to another aspect of the invention there is provided a Network Address Translator, NAT, arranged to translate between a public NAT address and a plurality of private NAT addresses for a plurality of network elements supported by the first NAT; wherein a first network element of the plurality of network elements has a plurality of network interfaces, each network interface corresponding to a private NAT address; the NAT comprising: a connection processor for supporting setting up of a connection for data communication between the first network element and a second network element, the connection being capable of supporting a plurality of network interfaces for the first network element; a transport processor for receiving a first network interface identifier identifying a first network interface for the connection; a data received for receiving at least some data packets for the first network element from the second network element, the at least some data packets comprising the first network interface identifier; and a translation processor for addressing the at least some data packets to the first network interface of the first network element in response to the first network interface identifier.

According to another aspect of the invention there is provided a method of operation for a communication network including a first Network Address Translator, NAT, arranged to translate between a public NAT address and a plurality of private NAT addresses for a plurality of network elements supported by the first NAT and a first network element of the plurality of network elements having a plurality of network interfaces, each network interface corresponding to a private NAT address; the method comprising: setting up a connection for data communication between the first network element and a second network element, the connection being capable of supporting a plurality of network interfaces for the first network element; initializing a first network interface identifier for identifying a first network interface for the connection; providing the first network interface identifier to at least the first network element, the second network element and the first NAT; the second network element including the first network interface identifier in at least some data packets for the first network element; and the first NAT addressing the at least some data packets to the first network interface of the first network element in response to the first network interface identifier.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a data communication network using a Stream Control Transport Protocol (SCTP) running on top of an Internet Protocol (IP). However, it will be appreciated that the invention is not limited to this application but may be applied to many other communication networks and protocols.

Figure 1:
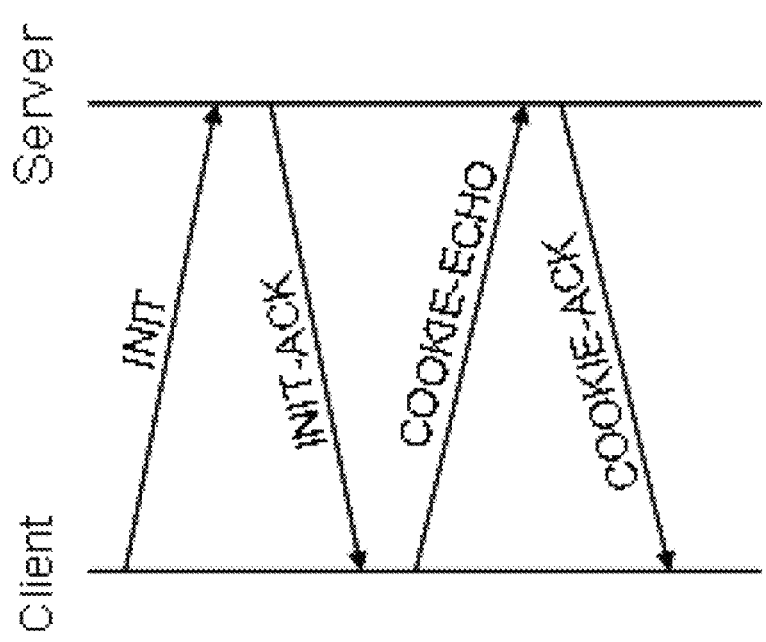
FIG. 1 is an illustration of an SCTP association setup message exchange.
Figure 2:
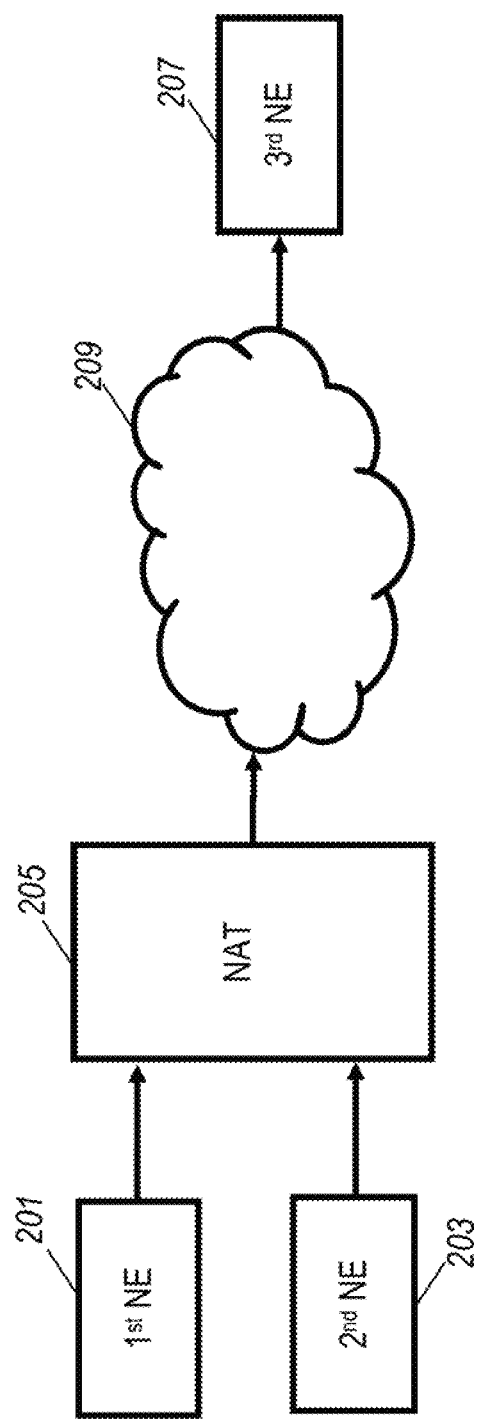
FIG. 2 is an illustration of elements of an SCTP network.
Figure 3:
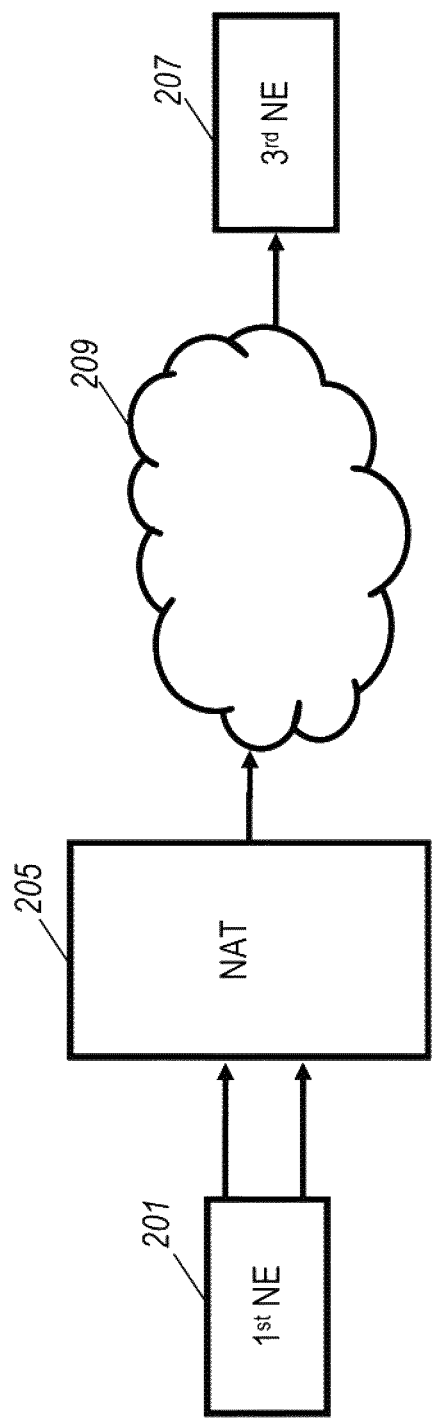
FIG. 3 is an illustration of elements of an SCTP network.
Figure 4:
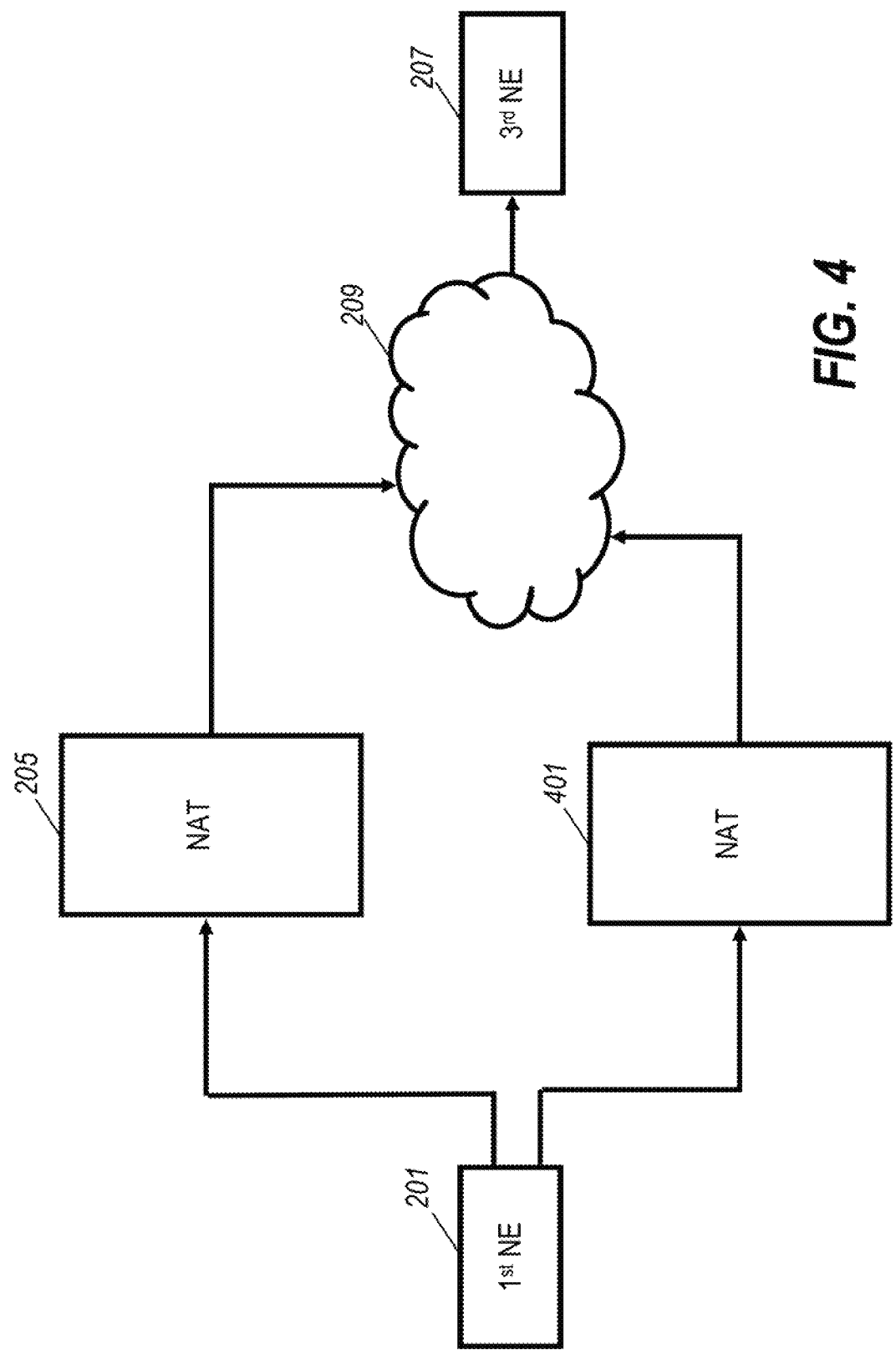
FIG. 4 is an illustration of elements of an SCTP network.
Figure 5:
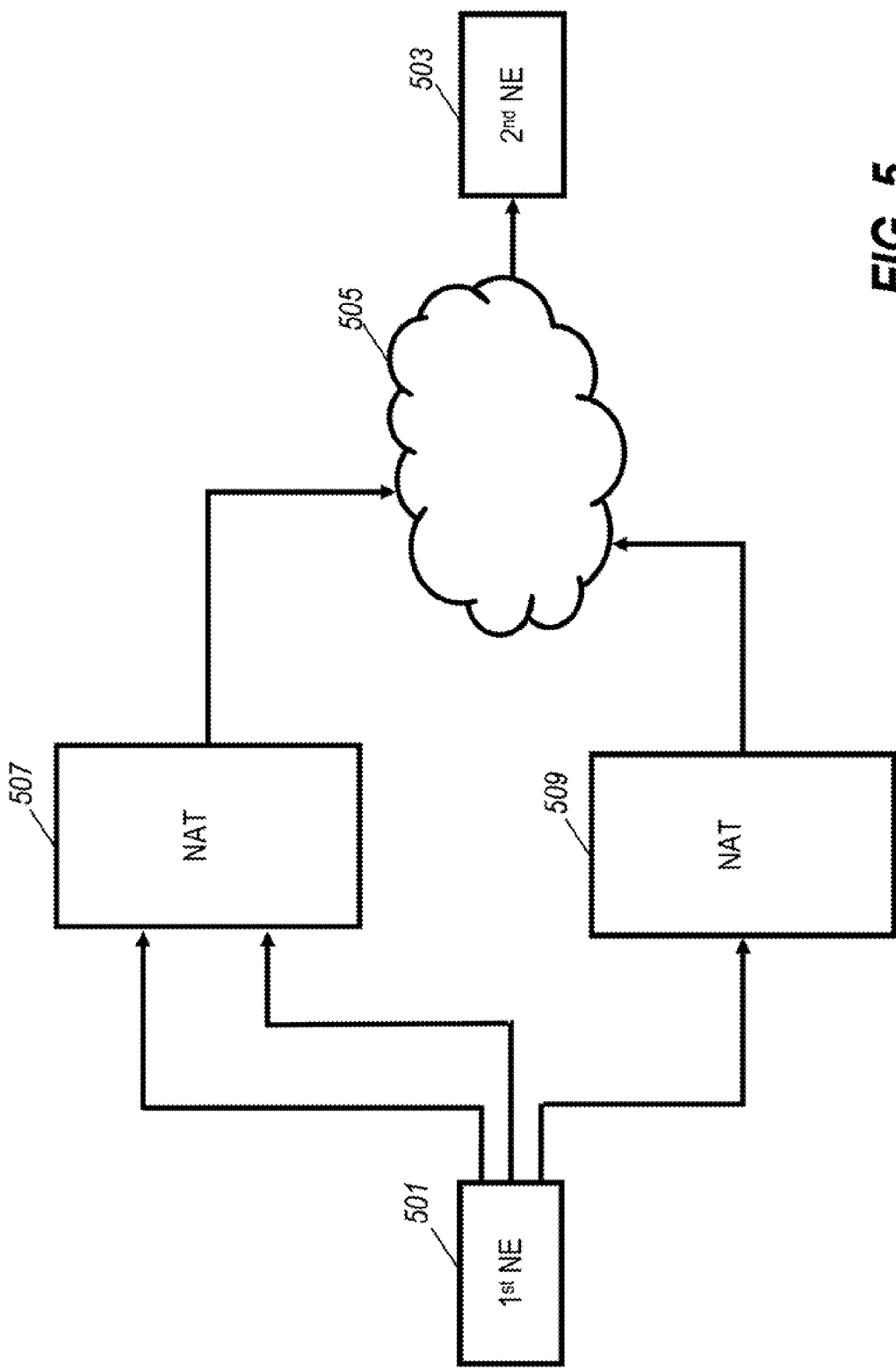
FIG. 5 illustrates an example of elements of a data communication network in accordance with some embodiments of the invention.

FIG. 5 illustrates an example of elements of a data communication network in accordance with some embodiments of the invention.

In the example, a first network element 501 is able to communicate with a second network element 503 via a data network 505. The data network 505 is in the specific example the Internet and the second network element 503 may execute an Internet server application accessed by the first network element 501.

In the system, the first network element 501 is part of a private network which is supported by a first and second NAT 507, 509 (it will be appreciated that in the specific example the term private network may be used to refer to the combination of two independent and separate private network, each of which is supported by of the one NATs 507, 509). Thus, all network elements of the private network (of which only the first network element 501 is shown in FIG. 5) has one or more individual private IP addresses that are only known to the NAT 507, 509. For all outgoing packets from a network element of the private network, the NATs 507, 509 replace the private IP address with the public IP address of the NAT 507, 509. Thus, all private IP addresses supported by a NAT 507, 509 are translated into the same public IP address of the NAT 507, 509.

Furthermore, for all incoming data packets to a network element of the private network, each NAT 507, 509 proceeds to replace the public IP address of the NAT 507, 509 with the appropriate private IP address of the network element the data packet is intended for before forwarding the data packet in the private network.

Thus, the NATs 507, 509 are capable of translating between a public NAT address, which is the NAT's 507, 509 IP address known to the network 505, and a plurality of private NAT addresses for network elements supported by the NAT. The private NAT addresses are specifically the IP addresses allocated to network elements of the private network which is supported by the NAT 507, 509. These addresses are private as they are not known globally (e.g. by the network 505) but are only known within the private network and specifically by the NAT 507, 509.

In the specific example, the first network element 501 is a multi-homed network element which has a plurality of network interfaces where each network interface corresponds to one link to the private network and to one private IP address of the first network element 501.

In particular, a network interface may be considered to correspond to a transport address where a transport address may be considered to correspond to the combination of a Network Layer address, a Transport Layer protocol and a Transport Layer port number. In the case of SCTP running over IP, a transport address corresponds to the combination of an IP address and an SCTP port number (where SCTP is the transport protocol).

In the example of FIG. 5, the first network element 501 has three network interfaces, corresponding to three transport addresses, and specifically the network element 501 is coupled to the private network via three separate and individual links. In the example, two of these network interfaces are supported by the first NAT 507 whereas the third network interface is supported by the second NAT 509.

In the system, each of the network elements, and especially the NATs 507, 509, operate individually and without any specific or explicit information of the exact architecture and network configuration. Specifically, the first network element 501 may operate without any information of which NAT is supporting its network interfaces or indeed whether it is actually supported by any NAT or is directly coupled to the data network 505. In particular, the first network element 501 may not be aware of whether an IP address of one of its network interfaces is a private IP address or a public IP address. Similarly, the first NAT 507 performs its operation without any coordination or co-operation with the second NAT 509 and indeed without having any information of whether the first network element 501 has any network interfaces supported by any other NATs.

Thus, in the system of FIG. 5, a substantially facilitated operation can be achieved and in particular high flexibility can be achieved where the configuration of the network may be dynamically changed without requiring any changes to the operation of any existing network elements. For example, an additional NAT may be introduced to the system without requiring other NATs or network elements to be informed of this.

This operation is enabled by the generation and distribution of a network interface identifier which is capable of identifying a specific transport within a connection between two network elements. In the system wherein a network interface is equivalent with a transport address, the network interface identifier may thus be a transport address identifier. Thus, the network interface identifier may be arranged to specify a specific transport address for a connection/association supporting a plurality of transport addresses for a network element.

A connection between two network terminals may correspond to the setup of framework to allow data exchange between the network elements. For example, setting up a connection may include agreeing protocols, exchanging addresses etc between the network elements. For SCTP, the term association is used for connection.

For example as indicated in STCP RFC (2960): "SCTP is connection-oriented in nature, but the SCTP connection is a broader concept than the TCP connection. SCTP provides the means for each SCTP endpoint to provide the other endpoint (during connection start-up) with a list of transport addresses (i.e., multiple IP addresses in combination with an SCTP port or network interface) through which that endpoint can be reached and from which it will originate SCTP packets. The connection spans transfers over all of the possible source/destination combinations which may be generated from each endpoint's lists." Each such combination may be termed a transport.

Specifically, messages used to set up a new association/connection and/or to change the number of transports within this association/connection all include a network interface identifier which is unique to the specific transport within the association/connection. Furthermore, data packets received from the network and addressed to a network element of the private network also includes the network interface identifier thereby allowing the NAT to perform address resolution based on the network interface identifier.

Thus, in the system, the NATs 507, 509 do not perform any port translation for a connection and the address translation is performed without considering the port numbers. Rather, port numbers selected by the first network element 501 are left unchanged by the NATs 507, 509 thereby allowing the port numbers to be used by the peers involved in a connection to identify the connection as required by SCTP. Furthermore, the approach allows improved support for multi-homed network elements where data is transferred on several network interfaces at the same time as it allows the IP addresses involved in an association to be changed dynamically with facilitated provision for adding and/or removing network interfaces within an association. The system also allows efficient support for network configurations where a multi homed network element may be supported by a plurality of NATs without requiring either the individual network element or the NATs to have knowledge of this fact. In particular, it automatically supports both multi-homed network elements having a plurality of network interfaces supported by a single NAT, a multi-homed network elements having a plurality of interfaces supported by more than one NAT as well as the support of several multi-homed network elements behind the same NAT.

Also, as will be described in the following, the approach will allow the data network 505 and specifically the second network element 503 to automatically obtain the required information needed in order to reach the first network element 501 on any of the possible network interfaces. Again, this may be achieved without the second network element 503 needing to have any information of the network configuration of the private network comprising the first network element 501 or indeed of whether the first network element 501 is supported by one or more NATs 507, 509.

Hence, the approach used in the system of FIG. 5 is widely applicable in many different scenarios and network configurations while at the same time allowing the operation of the individual elements to be independent of the specific configuration.

Figure 6:
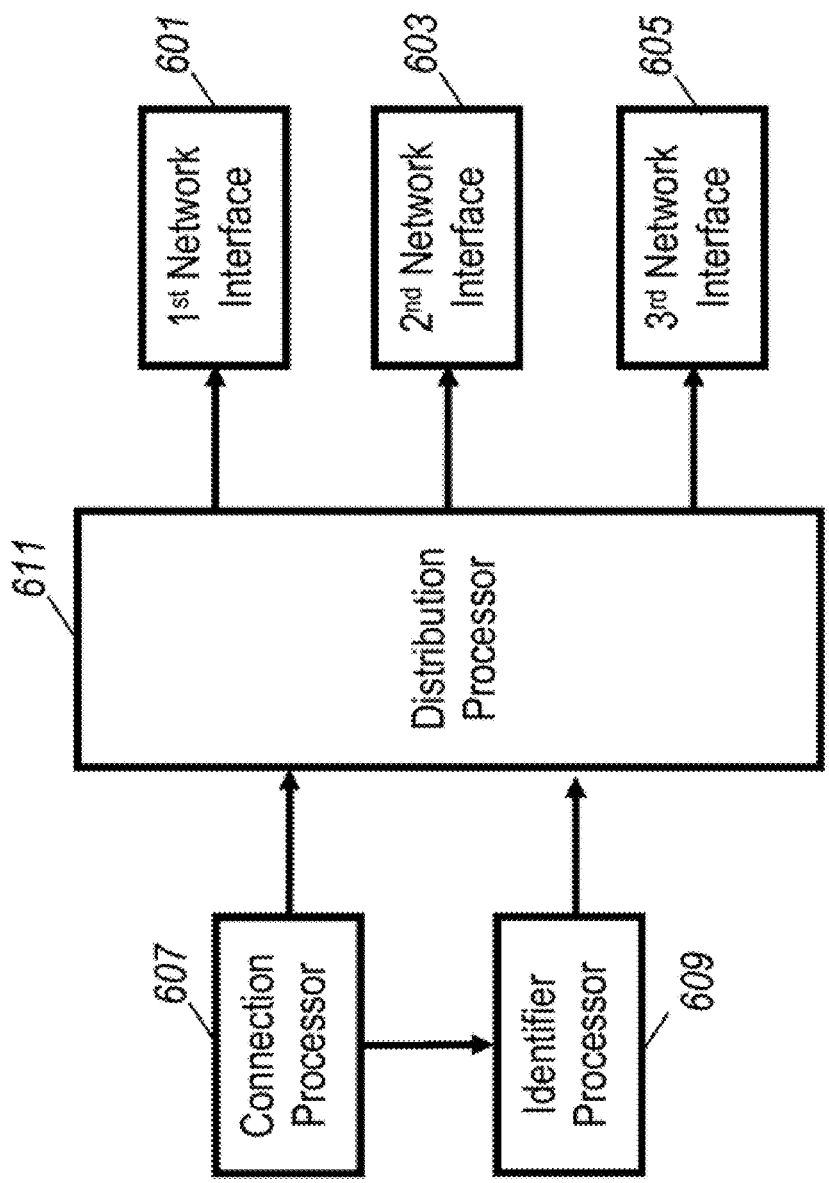
FIG. 6 illustrates an example of elements of a network element of a data communication network in accordance with some embodiments of the invention.

FIG. 6 illustrates some functional elements of the first network element 501 in more detail. In the example, the first network element 501 comprises three network interfaces 601-605 each of which supports a network interface for the first network element 501. It will be appreciated, that the network interfaces 601-605 may for example be implemented using the same functionality but with each network interface 601-605 being focussed on a different private IP address of the first network element 501.

The first network element 501 furthermore comprises a connection processor 607 which is arranged to control the setting up, tearing down and reconfiguration of connections. A connection specifically corresponds to a logical connection between the first network element 501 and another network element. For SCTP, a connection is specifically known as an association and may include a plurality of transports wherein each transport involves a different set of network interfaces/transport addresses so that the first network element 501 can receive and transmit data packets of an association on a plurality of the network interfaces/transport addresses. Specifically, the second network may be able to reach the first network element 501 via one or both of the network interfaces supported by the first NAT 507 and/or via the network interface supported by the second NAT 509.

Thus, the connection processor 607 is specifically capable of setting up an association for a data communication between the first network element 501 and the second network element 503 where the association can support a plurality of network interfaces for the first network element 501.

The first network element 501 furthermore comprises an identifier processor 609 which is coupled to the connection processor 607. The identifier processor 609 is arranged to generate a first network interface identifier for SCTP associations where the network interface identifier identifies a specific network interface for an association.

For example, when the connection processor 607 sets up a new association, it accesses the identifier processor 609 which proceeds to generate a network interface identifier for each of the network interfaces that are initially being set up. In the specific example, an association is initially set up with only one network interface/transport address and accordingly the identifier processor 609 generates a single network interface identifier for this network interface/transport address.

The network interface identifier may for example be a digital value represented by a suitable number of data bits. The identifier processor 609 ensures that the generated network interface identifier for the network interface is a unique identifier for the first network element 501, i.e. it ensures that the allocated network interface identifier value is not already assigned to another network interface.

The connection processor 607 is furthermore coupled to distribution processor 611 which is arranged to distribute the first network interface identifier to at least the first network element 501, the second network element 503 and the NAT 507, 509 supporting the network interface being initialized by the association. Specifically, the distribution processor 611 is coupled to the network interfaces 601-605 and is arranged to transmit a connection setup message using the network interface which is being initialized for the connection.

It will be appreciated that the distribution may be an implicit internal distribution such as the provision of the network interface identifier value to the relevant functionality of the first network element 501 itself. It will also be appreciated that the distribution is not necessarily a direct distribution but may be an indirect distribution. For example, the network interface identifier may be communicated to the second network element 503 using messages which are otherwise exchanged between the first network element 501 and the second network element 503, and/or between the NAT 507, 509 and the second network element 503. For example, in some embodiments, the network interface identifier may be communicated to a NAT using a first type of message and then communicated from the NAT to the second network element in a different type of message.

In the specific example, the network interface identifier is distributed to other network elements using messages that are used for a connection set up and reconfiguration in accordance with SCTP.

Specifically, the connection processor 607 may generate an SCTP INIT message in order to initialize the setup of the new association with the second network element 503. The distribution processor 611 may then include the network interface identifier generated by the identifier processor 609 and forward it to the network interface 601-605 that corresponds to the network interface which is initially set up for the association. The network interface 601-605 addresses this INIT message to the second network element 503 and transmits the message.

The INIT message is received by the NAT 507, 509 that supports the specific network interface. The NAT 507, 509 then proceeds to perform an IP address translation by replacing the private IP address of the first network element 501 with the public IP address of the NAT 507, 509. It furthermore extracts the network interface identifier and stores this together with other relevant data for the association, such as the private IP address of the first network element 501, the IP address of the second network element 503 and an identifier of the association (e.g. the V-tag). However, the NAT 507, 509 does not perform any port translation and indeed the port selected by the first network element 501 is left unchanged.

When receiving the INIT message, the second network element 503 proceeds to respond with an INIT-ACK message that also includes the network interface identifier received in the INIT message. Furthermore, the second network element 503 stores the network interface identifier for the network interface of the first network element 501 for future use.

The INIT-ACK message is addressed to the public IP address of the NAT 507, 509 from which the INIT message is received. When the INIT-ACK message is received by the NAT 507, 509, it proceeds to determine the appropriate (private) IP address of the first network element 501. Specifically, it uses the identification of the association together with the network interface identifier to determine the private IP address of the appropriate network interface of the first network element 501. It then proceeds to forward the INIT-ACK message to the first network element 501.

In response to receiving the INIT-ACK message, the first network element 501 responds with a COOKIE-ECHO message that is addressed to the second network element 503. This message is sent using the same interface and also includes the network interface identifier. This message is forwarded to the second network element 503 by the NAT 507, 509 using the same approach as for the INIT message. In response to receiving this message, the second network element 503 returns a COOKIE-ACK message which also includes the network interface identifier and is routed to the appropriate network interface of the first network element 501 using the same approach as for the INIT-ACK message.

Following this message exchange, the connection between the first network element 501 and the second network element 503 has been set up and the network elements 501, 503 can proceed to exchange data packets using the network path set up for the association. Furthermore, all data packets intended for a network interface includes the network interface identifier of that network interface and thus the appropriate NAT 507, 509 can resolve any address ambiguity using the network interface identifier.

In the system, the number of network interfaces allocated to a given association may be dynamically changed during a reconfiguration process. Specifically, a new network interface may be added to an existing association.

In the specific example, a new network interface may be added to an existing association by the connection processor 607 of the first network element 501 generating an SCTP ASCONF ADD message.

When generating this message to set up a new network interface for the association, the connection processor 607 contacts the identifier processor 609 which proceeds to generate a network interface identifier for this new network interface. The network interface identifier is selected as a unique value and specifically is selected such that it is not identical to any network interface identifier already allocated to a transport within the association.

The distribution processor 611 proceeds to include this network interface identifier in the ASCONF ADD message before addressing it to the second network element 503 and transmitting the message. Specifically, the message is transmitted using the network interface which is being set up.

When the appropriate NAT 507, 509 receives the ASCONF ADD message it performs the IP address translation by replacing the private IP address of this network interface with the public IP address of the NAT 507, 509. It furthermore notes the mapping between the network interface identifier for the association and the corresponding private IP address.

In response to receiving the ASCONF ADD message, the second network element 503 proceeds to store the network interface identifier for this new network interface for the first network element 501. It furthermore returns an ASCONF ACK message to confirm that the second network interface has been initialized for the association. The ASCONF ACK message includes the network interface identifier for the new network interface and the NAT 507, 509 uses the stored mapping between the network interface identifier and the private IP address of this network interface to determine the private IP address that should replace the public IP address of the NAT 507, 509 before the message is forwarded in the private network.

Thus, following the reconfiguration process, the connection includes two network interfaces which can be individually addressed by the second network element 503 and which can unambiguously be resolved by the NAT 507, 509.

The first network element 501 may further use the same reconfiguration process to initialized the third network interface for the association.

Figure 7:
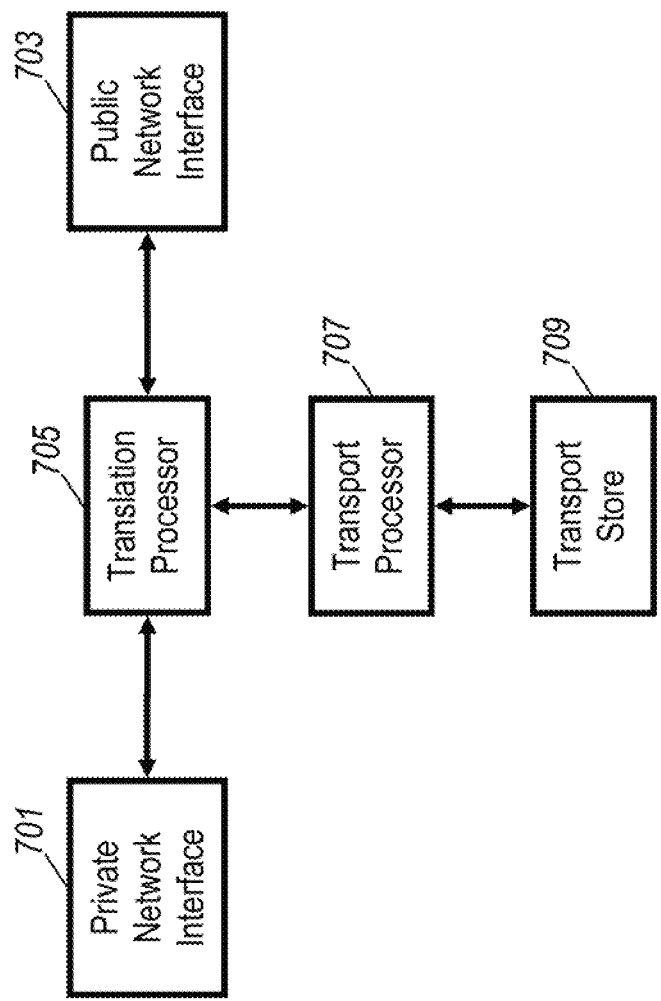
FIG. 7 illustrates an example of elements of a Network Address Translator for a data communication network in accordance with some embodiments of the invention.

FIG. 7 illustrates an example some elements of the first NAT 507. The NAT 507 comprises a private network interface 701 which couples the NAT 507 to the private network including the first network element 501. The NAT 507 furthermore comprises a public network interface 703 which couples the NAT 507 to the data network 505 and the second network element 503. The communication with network elements of the private network coupled to the private network interface 501 uses the private IP addresses whereas the communication with the data network 505 uses the public IP address of the NAT 507.

The first NAT 507 furthermore comprises a translation processor 705 which is arranged to perform the address translation between the public IP address of the NAT 507 and a private IP address of the network elements of the private network.

The translation processor 705 is furthermore coupled to a transport processor 707 which is coupled to a transport store 709. The transport processor 707 monitors the traffic between the private network interface 701 and the public network interface 703 to detect any association set up or reconfiguration. Whenever a new network interface identifier is received (e.g. in an INIT or ASCONF message) it is stored in the transport store 709 together with data identifying the association (specifically the V-tag), the private IP address of the network interface and the IP address of the other network element involved in the association.

Thus, a list of mappings between network interface identifiers and network interfaces for the network elements of the private network are stored in the transport store 709.

When an incoming data packet is received by the public network interface 703, the translation processor 705 extracts the source address for the data packet. Specifically, if an incoming data packet for the first network element 501 is received from the second network element 503 by the first NAT 507, the translation processor 705 proceeds to extract the IP address of the second network element 503. It furthermore extracts the network interface identifier included in the data packet and feeds this to the transport processor 707. The transport processor 707 then accesses the transport store 709 to find the appropriate mapping for the association between the first and second network elements 501, 503. It then proceeds to find a matching network interface identifier for this association and retrieves the private IP address of the network interface of the first network element 501 which is stored for that network interface identifier. The transport processor 707 then proceeds to provide this private IP address to the translation processor 705 which replaces the public IP address of the NAT 507 in the data packet before this is fed to the private network interface 701 for routing to the first network element 501 by the private network.

Thus, in the exemplary system, the network address translation performed by the NAT 507, 509 does not require ambiguity resolution using ports and therefore does not require any port translation to be performed by the NATs 507, 509. Rather, the addressing and routing of data packets to the individual network interfaces of the individual network elements is done using the network interface identifier.

For example, in the system of FIG. 5, the first and second network interface of the first network element 501 are served by the same NAT 507. However, the first NAT 507 can easily resolve the ambiguity of which private IP address to use for a specific incoming data packet in response to the stored mappings between private IP addresses and network interface identifiers. Furthermore, the ambiguity resolution can be achieved based only on information which is already received by the NAT 507 as part of the association set-up and reconfiguration processes and does not require any additional information or knowledge of e.g. the network configuration, or specifically of whether the individual network element is supported by other NAT(s), whether it is a multi-homing network element or not, how many network interfaces are part of the specific association etc.

Furthermore, the second network element 503 is able to fully and unambiguously specify which specific network interface of the first network element 501 should receive the transmitted data packets.

Also, the described approach is equally feasible for scenarios wherein a multi-homing network element is supported by two (or more) different NATs.

Specifically, in the scenario of FIG. 5, the first network element 501 transmits network interface identifier messages (such as the INIT and ASCONF messages) only on the network interface which is identified by the network interface identifier of the message. Furthermore, the INIT chunk (data packet) of the INIT message and the ASCONF chunk (data part) of the ASCONF message include only one private IP address. Thus, each association setup or network interface addition reconfiguration process is limited to a single network interface. By avoiding the simultaneous initialization of two network interfaces, it can be ensured that the messages are inherently received by the appropriate NAT and thus reach the second network element 503 with the public IP address of the appropriate NAT.

For example, if the INIT message initializes the first network interface supported by the first network interface 601 and the first NAT 507, this will automatically provide the first NAT 507 with the required information of the private IP address of that network interface such that it can be mapped to the network interface identifier by the NAT 507. Furthermore, as the INIT message being forwarded to the second network element 503 will inherently comprise the public IP address of the first NAT 507, any data packets intended for the first network interface will automatically be routed to the first NAT 507.

Thus, the association may be initialized with the first network interface without any involvement or knowledge by the second NAT 509. Furthermore, both the first NAT 507 and the second network element 503 are automatically provided with all the information they need to uniquely identify and use this network interface.

If the first network element 501 then proceeds to add the second network interface supported by the second network interface 603 and the first NAT 507 using an ASCONF ADD message, this ASCONF message will be transmitted on the second network interface and will thus also be received by the first NAT 507 which accordingly proceeds to generate a mapping between the corresponding network interface identifier and the private IP address of the second network interface. Furthermore, the second network element 503 is provided with information of not only the IP address to use to access this network interface (namely the public IP address of the first NAT 507) but also of the network interface identifier which is required to specifically identify this network interface of the connection. Thus, both the first NAT 507 and the second network element 503 are automatically provided with information that allows the individual network interface of the multi-homed network element 501 to be uniquely identified by both the second network element 503 and the first NAT 507. Again, this may be achieved without any involvement of, or knowledge by, the second NAT 509.

The first network element 501 may then proceed to add the third network interface supported by the third network interface 605 and the second NAT 509 to the association using an ASCONF ADD message. This ASCONF message will be transmitted on the third network interface and will thus be received by the second NAT 509 rather than the first NAT 507. The second NAT 509 then proceeds to generate a mapping between the IP address of the second network element 503, the network interface identifier of the message and the private IP address of the third network interface (and possibly of an association identification for the association).

The second NAT 509 furthermore proceeds to replace the private IP address of the third network interface with the public IP address of the second NAT 509 before forwarding the ASCONF message to the second network element 503. Thus, the second network element 503 is not only provided with the appropriate network interface identifier for that the specific network interface but is also automatically provided with the public IP address that needs to be used for any data packets for this third network interface (i.e. that of the second NAT 509).

Thus, the second NAT 509 and the second network element 503 is automatically provided with information that allows the third network interface of the multi-homed network element 501 to be uniquely identified by both the second network element 503 and the second NAT 509. Furthermore, this may be achieved without any involvement of, or even knowledge by, the first NAT 507.

Thus, in the system, the restriction that a new network interface identifier is always transmitted on the network interface to which it relates ensures that it is automatically distributed to the relevant network elements and specifically it is insured that the network interface identifier is provided to the specific NAT that serves this network interface. Furthermore, this is guaranteed without requiring the network element to have any information, or in any way to take into consideration, whether it is supported by one or more NATs or indeed whether it is supported by any NAT whatsoever.

Also, it ensures that each NAT has sufficient information to resolve any address ambiguity without requiring it to coordinate or co-operate with any other NAT, or indeed without it needing to have any information of whether the specific network element has any other network interfaces supported by other NATs.

At the same time, the approach ensures that the other network element of the association has not only information of how many network interfaces are used for the association but also has the specific information needed to uniquely address the individual network interface and automatically address the appropriate NAT.

Thus, it will be appreciated that the operation of the individual NATs and network elements is completely independent of the actual NAT architecture. Specifically, the described approach will automatically adapt itself to all situations regardless of whether the network element is a single network interface network element, or whether it is a multi-homed network element. Also, it will automatically adapt itself to whether the multi-homed network element has a plurality of network interfaces served by the same NAT and/or served by different NATs. Furthermore, this adaptation may be achieved without requiring the operation of the individual network element or NAT to change. Thus the described approach may allow a very flexible network configuration and may for example allow facilitated addition or removal of NATs to a system.

In some embodiments, the NATs may be arranged to delete a stored mapping between a private IP address and a network interface identifier in response to the time that has elapsed since a data packet was last received which has a network interface identifier that matches the stored link. Specifically, the NAT's mapping list may be cleaned at regular intervals to remove links that have timed-out after a period without packet exchange.

In the described example, the generation and distribution of the network interface identifier was initialized in the first network element 501. However, in other embodiments, the network interface identifier may be generated in other physical, logical or architectural locations. For example, the functionality for generating and distributing a network interface identifier for each network interface of an association may be located in the NAT. For example, the NAT 507 may generate the network interface identifier in response to receiving an INIT or ASCONF message from the first network element 501 and may then distribute the generated networ interface identifier to the first network element 501 and the second network element 503. Specifically, the NAT 507 may include the network interface identifier in the INIT or ASCONF message being forwarded to the second network element 503.

In the following, a specific example of the operation of the system of FIG. 5 will be described for a scenario wherein an association using two network interfaces is set up between the first and second network element 501, 503. Specifically, the association uses the first network interface for the first network element 501 which is supported by the first NAT 507 as well as the third network interface which is supported by the second NAT 509. For brevity, the first network element 501 is denoted NE1, the second network element is denoted NE2, the first NAT 507 is denoted NAT1, the second NAT 509 is denoted NAT2, the first network interface is denoted NE1:IF1 and the third network interface is denoted NE1:IF2. Furthermore, in the example, NE1:IF1 has the private IP address 192.168.1.2, NE1:IF2 has the private IP address 192.168.1.3, the first NAT 507 has the public IP address 10.0.0.1 and the second NAT 509 has the IP address 10.0.0.2.

|  | NE1 | NAT1 | NAT2 | NE2 |
|---|---|---|---|---|
| Step 1: From NE1 to NE2 | Chooses one interface to initiate the SCTP association (IF1 192.168.1.2) and sends an INIT chunk containing only this IP address to NE2 using IF1. A network interface identifier (e.g. 000A) identifying the network interface (and thus the transport between NE1:IF1 and NE2) is associated to the INIT chunk. | Receives the INIT chunk from NE1:IF1 and stores the mapping 000A <-> 192.168.1.2. It then forwards the packet to NE2 changing the IP address in the IP packet header to 10.0.0.1 (NAT1's public IP address). |  | Receives the INIT chunk and stores the mapping between the public IP address from the IP packet header, the private IP address from the INIT packet and the network interface identifier (from the SCTP packet header). |
| Step 2: From NE2 to NE1 | Receives the INIT-ACK and completes the SCTP connection initialisation by sending a COOKIE-ECHO packet. | Receives an SCTP packet from NE2 on its public interface, reads the network interface identifier and then knows which address to forward the packet to: 192.168.1.2 (NE1:IF1). |  | Sends an INIT-ACK to NE1 using the Public IP address associated with NE1:IF1's Private IP Address (i.e. to NAT1's public address). It includes the network interface identifier previously received (the network interface identifier for the transport between NE1:IF1 and NE2; i.e. 000A). |
| Step 3: From NE1 to NE2 | The COOKIE-ECHO packets and COOKIE-ACK packets follow the same process as the INIT chunk above. Thus the NE1 receives a COOKIE-ACK chunk. Upon this last packet reception, NE1 sends an ASCONF-ADD containing the IP address of IF2 (192.168.1.3) |  | Receives an SCTP packet from NE1:IF2 and stores the mapping 000B <-> 192.168.1.3. Then forwards the packet to NE2 changing the IP address in the IP packet header to 10.0.0.2 (NAT2's public IP addresses). | Receives the ASCONF-ADD message and stores the mapping between the public IP address from the IP packet header, the private IP address from the INIT chunk and the network interface identifier (from the SCTP packet |

-continued

| | NE1 | NAT1 | NAT2 | NE2 |
|---|---|---|---|---|
| | using the interface IF2 and inserting the network interface identifier corresponding to NE1:IF2 (e.g. 000B). | | | header). |
| Step 4: From NE2 to NE1 | Receives the ASCONF-ACK and then starts using the second interface. | | Receives an SCTP packet from NE2 on its public interface, reads the network interface identifier and then knows who to forward the packet to: 192.168.1.3 (NE1:IF2). | Sends an ASCONF-ACK to NE1 using the Public IP address associated with NE1:IF2's private IP Address (is equal to NAT2's public IP address). The network interface identifier included in the response is 000B. |
| Step 5: From NE1 to NE2 | NE1 decides to stop using its IF1 in the SCTP association and sends an ASCONF-DEL to NE2 using IF2. | | Forwards the packet to NE2 changing the address in the IP Header to its public IP address. | Receiving this packet, NE2 is able to remove the reference and the mapping to the NAT1 public address, the NE1:IF1 private address and the network interface identifier of the associated transport. |

The table provided below describes some of the processing that may be performed by the NATs depending on the data packet type and on where the data packet is received from. This applies for packets crossing the NAT (packets from a network element having a private address to a network element having a public address or vice-versa). Processing is performed by packet, and not by SCTP chunk, by examining the first chunk of the packet, as special cases treated below are to be alone in the packet.

| | Packet coming from private network interface (from NAT-ed hosts) | Packet coming from data network interface (public interface) |
|---|---|---|
| DATA | Find in the lookup table the association corresponding to (Source Address, Destination Address, network interface identifier). Reset timeout corresponding to the association. Translate IP Address in the IP Header to public IP Address and send the packet. Insert in the mapping table the mapping (Source Address, Destination Address, network interface identifier). | Find in the lookup table the association corresponding to (Source Address, network interface identifier). Reset timeout corresponding to the association. Translate IP Address in the IP Header to the Private IP address for this association and send the packet. |
| INIT | | As for DATA. |

|  | Packet coming from private network interface (from NAT-ed hosts) | Packet coming from data network interface (public interface) |
|---|---|---|
| INIT-ACK | As for DATA. | As for DATA. |
| SACK | As for DATA. | As for DATA. |
| HEARTBEAT | As for DATA. | As for DATA. |
| HEARTBEAT-ACK | As for DATA. | As for DATA. |
| ABORT | Find in the mapping table the association corresponding to (Source Address, Destination Address, network interface identifier). Remove this entry from the mapping table. Translate IP Address in the IP Header to public IP Address and send the packet. | Find in the lookup table the association corresponding to (Source Address, network interface identifier). Remove this entry from the lookup table. Translate IP Address in the IP Header to the private IP address for this association and send the packet. |
| SHUTDOWN | As for DATA. | As for DATA. |
| SHUTDOWN-ACK | As for DATA. | As for DATA. |
| ERROR |  |  |
| COOKIE-ECHO | As for DATA. | As for DATA. |
| COOKIE-ACK | As for DATA. | As for DATA. |
| ECNE | As for DATA. | As for DATA. |
| CWR | As for DATA. | As for DATA. |
| SHUTDOWN-COMPLETE | As for ABORT. | As for ABORT. |
| FORWARD-TSN | As for DATA. | As for DATA. |
| ASCONF | If the ASCONF contains an ADD (addition of an IP address to the association), insert in the mapping table the mapping (Source Address, Destination Address, network interface identifier): store the Correlation ID of the ASCONF packet (which helps a network element to correlate an entry of an ASCONF-ACK chunk with an entry of the corresponding ASCONF) as well as the transport identification information (the network interface identifier and the IP address to be added) in an "Add-pending" table, translate IP Address in the IP Header to public IP Address and send the packet. If the ASCONF contains a DEL (removal of the IP address from the association): translate the IP Address in the IP Header to the public IP Address and send the packet, if the address to be deleted is behind the very same NAT device we are sending the chunk on, store the Correlation ID as well as the transport identification data (network interface identifier and IP address to be deleted) in a "Del-pending" table. |  |
| ASCONF-ACK | As for DATA. | Find in the "Add-pending" (resp. "Del-pending) table the entry corresponding to the ASCONF-ACK correlation ID and add a new (resp. remove the old) entry in the mapping table for this association. |
| PKT-DROP | As for DATA. | As for DATA. |
| AUTH | As for DATA. | As for DATA. |

Figure 8:
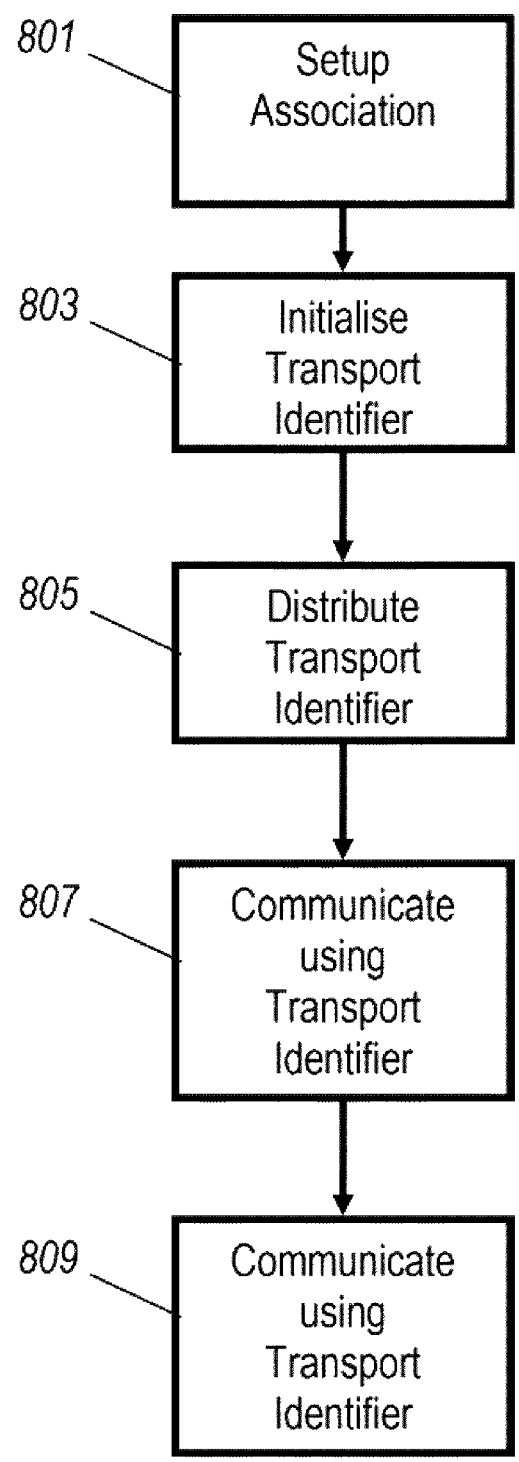
FIG. 8 illustrates an example of a method of operation for a data communication network in accordance with some embodiments of the invention.

FIG. 8 illustrates an example of a method of operation for a communication network including a first Network Address Translator, NAT, arranged to translate between a public NAT address and a plurality of private NAT addresses for a plurality of network elements supported by the first NAT and a first network element of the plurality of network elements having a plurality of network interfaces, each network interface corresponding to a private NAT address.

The method initiates in step 801 wherein a connection for data communication is setup between the first network element and a second network element. The connection is capable of supporting a plurality of network interfaces for the first network element.

Step 801 is followed by step 803 wherein a first network interface identifier is initialized for identifying a first network interface for the connection.

Step 803 is followed by step 805 wherein the first network interface identifier is provided to at least the first network element, the second network element and the first NAT.

Step 805 is followed by step 807 wherein the second network element includes the first network interface identifier in at least some data packets for the first network element.

Step 807 is followed by step 809 wherein the first NAT routes the at least some data packets to the first network interface of the first network element in response to the first network interface identifier.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A communication network comprising:
   a first Network Address Translator, NAT, arranged to translate between a public NAT address and a plurality of private NAT addresses for a plurality of network elements supported by the first NAT;
   a first network element of the plurality of network elements having a plurality of network interfaces, each network interface corresponding to a private NAT address;
   a connection processor for setting up a connection for data communication between the first network element and a second network element, the connection being capable of supporting a plurality of network interfaces for the first network element;
   an identifier processor for initializing a first network interface identifier for identifying a first network interface for the connection, wherein the first network interface identifier is unique for the connection;
   a distribution processor for providing the first network interface network interface identifier to at least the first network element, the second network element and the first NAT; and wherein
   the second network element is arranged to include the first network interface identifier in at least some data packets for the first network element; and
   the first NAT is arranged to address the at least some data packets to the first network interface of the first network element in response to the first network interface identifier.

2. The communication network of claim 1 wherein
   the identifier processor is arranged to initialize a second network interface identifier for identifying a second network interface for the connection;
   the distribution processor is arranged to provide the second network interface identifier to at least the first network element, the second network element and an associated NAT supporting the second network interface;
   the second network element is arranged to include the second network interface identifier in at least some further data packets for the first network element; and
   the associated NAT is arranged to address the at least some further data packets to the second network interface of the first network element in response to the second network interface identifier.

3. The communication network of claim 2 wherein the first NAT and the associated NAT are the same.

4. The communication network of claim 2 wherein the first NAT and the associated NAT are different NATs.

5. The communication network of claim 1 wherein the first NAT is arranged to store a list of mappings between network interface identifiers and network interfaces for the plurality of network elements; and to select a destination network interface for a network element of the plurality of network elements for a first data packet in response to a source address for the first data packet and a stored mapping matching a network interface identifier of the first data packet.

6. The communication network of claim 5 wherein the first NAT is arranged to delete a stored mapping in response to a time elapsed since receiving a data packet having a network interface identifier matching the stored mapping.

7. The communication network of claim 1 wherein the distribution processor is arranged to distribute the first network interface identifier during connection setup for the connection.

8. The communication network of claim 7 wherein the identifier processor and the distribution processor are comprised in the first network element and the identifier processor is further arranged to initialize a second network interface identifier for identifying a second network interface within the connection; and the distribution processor is arranged to provide the second network interface identifier to at least the second network element and an associated NAT for the second network interface as part of a reconfiguration process subsequent to the connection setup; and wherein
   the second network element is arranged to include the second network interface identifier in at least some further data packets for the first network element; and
   the associated NAT is arranged to address the at least some further data packets to the second network interface of the first network element in response to the second network interface identifier.

9. The communication network of claim 8 wherein the distribution processor is arranged to transmit network interface identifier messages only on a network interface identified by the network interface identifier of the network interface identifier message.

10. The communication network of claim 1 wherein the identifier processor is comprised in the first network element.

11. The communication network of claim 1 wherein the first NAT is arranged to not perform any port translation for the connection.

12. The communication network of claim 1 wherein the connection is a Stream Control Transmission Protocol, SCTP, connection.

13. The communication network of claim 12 wherein the distribution processor is arranged to include the first network interface identifier in an SCTP INIT message.

14. The communication network of claim 13 wherein the identifier processor and the distribution processor are comprised in the first network element and the identifier processor is arranged to generate a second network interface identifier for a second network interface of the first network element, and the distribution processor is arranged to transmit the second network interface identifier in an SCTP ASCONF message.

15. The communication network of claim 14 wherein distribution processor is arranged to transmit the SCTP INIT message on the first network interface and the SCTP ASCONF message on the second network interface.

16. The communication network of claim 13 wherein the distribution processor is arranged to include a maximum of one private NAT address in an INIT chunk of the SCTP INIT message.

17. The communication network of claim 13 wherein the distribution processor is arranged to include the first network interface identifier in an ASCONF message.

18. The communication network of claim 17 wherein the distribution processor is arranged to include a maximum of one private NAT address in an ASCONF chunk of the ASCONF message.

19. A Network Address Translator, NAT, arranged to translate between a public NAT address and a plurality of private NAT addresses for a plurality of network elements supported by the first NAT; wherein a first network element of the plurality of network elements has a plurality of network interfaces, each network interface corresponding to a private NAT address; the NAT comprising:
   a connection processor for supporting setting up of a connection for data communication between the first network element and a second network element, the connection being capable of supporting a plurality of network interfaces for the first network element;
   a transport processor for receiving a first network interface identifier identifying a first network interface for the connection, wherein the first network interface identifier is unique for the connection;
   a public network interface for receiving at least some data packets for the first network element from the second network element, the at least some data packets comprising the first network interface identifier; and
   a translation processor for addressing the at least some data packets to the first network interface of the first network element in response to the first network interface identifier.

20. A method of operation for a communication network including a first Network Address Translator, NAT, arranged to translate between a public NAT address and a plurality of private NAT addresses for a plurality of network elements supported by the first NAT and a first network element of the plurality of network elements having a plurality of network interfaces, each network interface corresponding to a private NAT address; the method comprising:
   setting up a connection for data communication between the first network element and a second network element, the connection being capable of supporting a plurality of network interfaces for the first network element;
   initializing a first network interface identifier for identifying a first network interface for the connection, wherein the first network interface identifier is unique for the connection;
   providing the first network interface identifier to at least the first network element, the second network element and the first NAT;
   the second network element including the first network interface identifier in at least some data packets for the first network element; and
   the first NAT addressing the at least some data packets to the first network interface of the first network element in response to the first network interface identifier.

* * * * *